United States Patent
Kim et al.

(10) Patent No.: US 9,614,469 B2
(45) Date of Patent: Apr. 4, 2017

(54) APPARATUS AND METHOD FOR CONTROLLING ELECTRIC VEHICLE

(71) Applicant: Hyundai Motor Company, Seoul (KR)

(72) Inventors: Jung Shik Kim, Seoul (KR);
Sanghoon Moon, Gyeonggi-do (KR);
WoongChan Chae, Gyeonggi-do (KR);
Kyoungbum Kim, Gyeonggi-do (KR);
SangHwa Do, Gyeonggi-do (KR);
Hyoungjun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/746,303

(22) Filed: Jun. 22, 2015

(65) Prior Publication Data
US 2016/0173013 A1    Jun. 16, 2016

(30) Foreign Application Priority Data
Dec. 15, 2014    (KR) .................. 10-2014-0180670

(51) Int. Cl.
*H02P 1/00*    (2006.01)
*H02P 6/10*    (2006.01)
*B60L 11/18*    (2006.01)
*H02P 21/22*    (2016.01)

(52) U.S. Cl.
CPC ............ *H02P 6/10* (2013.01); *B60L 11/1803* (2013.01); *H02P 21/22* (2016.02); *Y02T 10/7258* (2013.01)

(58) Field of Classification Search
CPC ........ H02P 6/10; H02P 27/08; H02P 21/0003; B60W 10/04; B60W 30/143
See application file for complete search history.

(56) References Cited

U.S. PATENT DOCUMENTS 8,113,307 B2 *  2/2012  Holland .............. B60L 11/1877
                                                          180/65.1

FOREIGN PATENT DOCUMENTS

| JP | 07-079588 A | 3/1995 |
| JP | 4424335 B2 | 3/2010 |
| KR | 2014-0028772 A | 3/2014 |
| KR | 10-1405237 B1 | 6/2014 |

* cited by examiner

*Primary Examiner* — Karen Masih
(74) *Attorney, Agent, or Firm* — Mintz Levin Cohn Ferris Glovsky and Popeo, P.C.; Peter F. Corless

(57) ABSTRACT

An apparatus and method for controlling an electric vehicle are provided. The apparatus includes a battery that is configured to charge electrical energy and a motor that is configured to generate a driving torque from electrical energy charged in the battery. A controller is configured to determine a driving range of the vehicle, perform maximum efficiency control in which efficiency of the motor is maximized when the driving range of the vehicle is a main driving range, and perform minimum torque ripple control in which torque ripple of the motor is minimized when the driving range of the vehicle is a supplementary driving range.

12 Claims, 3 Drawing Sheets

APPARATUS AND METHOD FOR CONTROLLING ELECTRIC VEHICLE

CROSS-REFERENCE TO RELATED APPLICATION

This application claims priority to and the benefit of Korean Patent Application No. 10-2014-0180670 filed in the Korean Intellectual Property Office on Dec. 15, 2014, the entire contents of which are incorporated herein by reference.

BACKGROUND (a) Field of the Invention

The present invention relates to an apparatus and a method for controlling an electric vehicle, and more particularly, to an apparatus and a method for controlling an electric vehicle to reduce torque ripple of a motor by using different control strategies based on a driving range of a vehicle.

(b) Description of the Related Art

To solve environmental pollution problems and to use alternative energy, an electric vehicle has been developed. The electric vehicle includes a motor for driving the vehicle and a high voltage battery configured to supply power to the motor. The battery is an energy source used to drive the motor and supplies power to the motor via an inverter. In general, a permanent magnet type of motor is applied to an electric vehicle, a hybrid vehicle, a fuel cell vehicle, and the like, as a driving means. The inverter is configured to convert a direct-current (DC) voltage into a three-phase alternating current (AC) voltage (u-phase, v-phase, and w-phase) to provide the converted AC voltage to a motor through a power cable, and a motor controller is configured to operate the inverter through pulse width modulation (PWM).

There are various control methods for controlling the vehicle. Generally, a motor control method that sets a current map from an operation point that minimizes output current based on a required torque and a vehicle speed has been used. However, since the conventional motor control method only considers efficiency of the motor, vibration and noise (NVH: noise, vibration, and harshness) generated when the vehicle starts rapidly, the vehicle rapidly accelerates, or the vehicle rapidly decelerates, are deteriorated.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling of an electric vehicle that may reduce vibration and noise generated when the vehicle starts rapidly, rapidly accelerates, or rapidly decelerates.

An apparatus for controlling an electric vehicle according to an exemplary embodiment of the present invention may include: a battery configured to charge electrical energy; a motor configured to generate a driving torque from electrical energy charged in the battery; and a controller configured to determine a driving range of the vehicle, perform maximum efficiency control in which efficiency of the motor is maximized when the driving range of the vehicle is a main driving range, and perform minimum torque ripple control in which torque ripple of the motor is minimized when the driving range of the vehicle is a supplementary driving range.

The controller may further be configured to divide the driving range of the vehicle into a main driving range and a supplementary driving range from a motor speed and a required torque of a driver. The maximum efficiency control may be a minimum current control in which current consumed in the motor may be minimized. In the minimum current control, the controller may be configured to select a current command configured with the d-axis current and the q-axis current from a predetermined current map, in which combination of the d-axis current and the q-axis current may minimize current consumed in the motor based on the required torque and the motor speed, and the controller may be configured to output the current command. In the minimum torque ripple control, the controller may be configured to select a current command configured with the d-axis current and the q-axis current from a predetermined current map, in which combination of the d-axis current and the q-axis current may minimize vibration and noise of the motor based on the required torque and the motor speed, and the controller may be configured to output the current command.

A method for controlling an electric vehicle according to another exemplary embodiment of the present invention may include: determining a driving range of the vehicle; and selectively performing maximum efficiency control that maximizes efficiency of a motor or minimum torque ripple control that minimizes a torque ripple of the motor based on the driving range of the vehicle. The driving range of the vehicle may be divided into a main driving range and a supplementary driving range from a motor speed and a required torque of a driver. The maximum efficiency control may be a minimum current control in which current consumed in the motor may be minimized.

A current command configured with a d-axis current and a q-axis current may be selected from a predetermined current map, in which combination of the axis current and the q-axis according to the required torque and the motor speed minimizes current consumed in the motor, and the current command may be output when the driving range of the vehicle is the main driving range. A current command configured with a d-axis current and a q-axis current may be selected from a predetermined current map, in which combination of the d-axis current and the q-axis current based on the required torque and the motor speed minimizes torque ripple of the motor, and the current command may be output when the driving range of the vehicle is the supplementary driving range.

According to an exemplary embodiment of the present invention, a minimum current control strategy or a minimum torque ripple strategy may be used based on a driving range of the vehicle, to reduce fuel consumption of the vehicle, and vibration and noise.

BRIEF DESCRIPTION OF THE DRAWINGS

The attached drawings illustrate exemplary embodiments of the present invention, and are provided for describing the present invention in more detail, but not for limiting technical aspects of the present invention.

DETAILED DESCRIPTION

Figure 1:
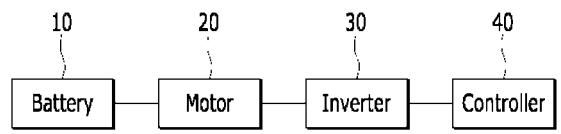
FIG. 1 is an exemplary block diagram illustrating an apparatus for controlling an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The parts not related to the description of the exemplary embodiments are not shown to make the description clear, and like reference numerals designate like elements throughout the specification. The sizes and thicknesses of the configurations shown in the drawings are selectively provided for convenience of description, such that the present invention is not limited to those shown in the drawings, and the thicknesses are exaggerated to make some parts and regions more clear.

Hereinafter, an apparatus for controlling an electric vehicle according to an exemplary embodiment of the present invention will be described in detail with reference to accompanying drawings.

FIG. 1 is an exemplary block diagram illustrating an apparatus for controlling an electric vehicle according to an exemplary embodiment of the present invention. As shown in FIG. 1, an apparatus for controlling an electric vehicle may include a battery 10, an inverter 30, a motor 20, and a controller 40 configured to operate the inverter 30 and motor 20.

The battery 10 may be configured to charge electrical energy, and the motor 20 may be configured to generate a driving torque to run the vehicle from electrical energy charged in the battery 10. The controller 40 may be configured to output a current and generate a current command that corresponds to a synchronous reference frame based on the motor speed and required torque, transform the current command to a voltage command corresponding to the synchronous reference frame, transform the voltage command to a PWM signal, and output the PWM signal.

A switching element of the inverter 30 may be configured to perform a switching operation based on the PWM signal output form the controller 40, and a three-phase current may flow to the motor 20 from the inverter 30. The controller 40 may be at least one processor operative according to a preset program, wherein the preset program is made to perform the steps of a method for controlling an electric vehicle according to an exemplary embodiment of the present invention.

The controller 40 may be configured to divide the driving range into a main driving range and a supplementary driving range from the motor speed and required torque of a driver. The controller 40 may further be configured to perform maximum efficiency control in which efficiency of the motor 20 may be maximized, and minimum torque ripple control in which torque ripple of the motor 20 may be minimized based on the driving range of the vehicle. The maximum efficiency control is a method in which the controller may be configured to output a current command such that efficiency of the motor may be maximized considering iron loss of the motor 20. The maximum efficiency control may be a minimum current control in which current consumed in the motor 20 may be minimized.

The driving range of the vehicle may be divided into a main driving range and a supplementary driving range based on the motor speed and the required torque of the driver. The driving range may be set as the main driving range when the motor speed is less than a predetermined speed range and the required torque is less than a predetermined torque range, and the driving range excluding the main driving range may be set as the supplementary driving range. The required driver torque may be determined from information regarding an accelerator and a brake pedal disposed within the vehicle.

The driving range of the vehicle may be divided into the main driving range and the supplementary driving range from a test result of an Urban Dynamometer Driving Schedule (UDDS) mode and a Highway (HWY) mode. In other words, the motor speed range and the torque range commonly used through the test of the UDDS mode and the HWY mode may be set as the main driving range, and the other range may be set as the supplementary driving range. However, the present invention is not limited thereto, and the driving range may be set by other methods.

Figure 2:
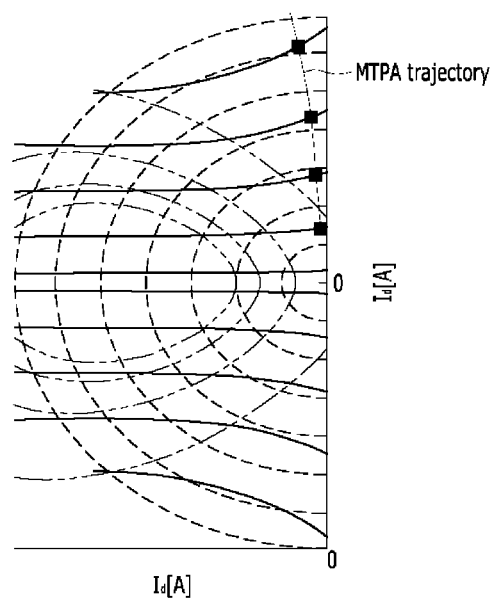
FIG. 2 is an exemplary graph illustrating an equal torque curve.

FIG. 2 is an exemplary graph illustrating an equal torque curve. In FIG. 2, an equal torque curve (referring to a solid line), a constant current circle (referring to a dotted line), and a constant voltage circle (referring to a two-point chain line) based on a motor speed are illustrated. The equal torque curve displays a trajectory of a current vector that generates constant torque based on a combination of a d-axis current and a q-axis current. The constant current circle displays a trajectory of a current vector that generates a constant current based on a combination of the d-axis current and the q-axis current. The constant voltage circle displays a trajectory of a current vector that generates a constant voltage based on a combination of the d-axis current and the q-axis current.

In FIG. 2, a common part of the constant current circle and the constant voltage circle is a controllable region. As shown in FIG. 2, combinations of the d-axis current and the q-axis current satisfying specific torque and motor speed are infinite. Further, although torque of the motor is about the same, a magnitude of torque ripple generated from the motor based on a combination of the d-axis current and the q-axis current becomes different. Therefore, a current map may be acquired based on the motor speed and the torque, and the motor 20 may be operated by combining the d-axis current and the q-axis current based on the driving range of the vehicle.

The controller 40 may be configured to store current commands that correspond to the required torque and the motor speed in a current map format. The current map may be configured with the d-axis current and the q-axis current of a synchronous reference frame that corresponds to the required torque and the motor speed. The current map may be determined from a computer simulation. For example, the magnitude and phase difference of the d-axis current and the q-axis current may be swept at a predetermined interval, and torque of the motor 20, efficiency of the motor 20, and torque ripple of the motor 20 may be determined through computer simulation based on the magnitude and the phase difference of the d-axis current and the q-axis current.

The magnitude and phase that correspond to the torque of the motor 20 calculated from the computer simulation may be transformed to the d-axis current and the q-axis current of the synchronous reference frame, and the d-axis current and the q-axis current that correspond to the motor speed and the motor torque may be stored in the controller in a current map format. The torque of the motor, the efficiency of the motor, and the torque ripple of the motor based on the combination of the d-axis current and the q-axis current may be determined from the current map.

As described above, the controller 40 may be configured to perform maximum efficiency control in which efficiency of the motor 20 may be maximized and minimum torque ripple control in which torque ripple of the motor 20 may be minimized based on the driving range of the vehicle. Accordingly, the maximum efficiency control may be a minimum current control in which current consumed in the motor 20 may be minimized. In other words, the controller 40 may be configured to perform the maximum efficiency control in which the efficiency of the motor may be maximized when the driving range of the vehicle is the main driving range, and the controller 40 may be configured to perform the minimum torque ripple control in which the torque ripple of the motor 20 may be minimized when the driving range of the vehicle is the supplementary driving range.

The main driving range may be a driving range commonly used while driving the vehicle. Since the main driving range may be commonly used driving range, as the efficiency of the main driving range is increases, fuel consumption of the vehicle may be reduced. Therefore, when the driving range of the vehicle is the main driving range, the controller 40 may be configured to perform a control strategy for minimizing fuel consumption.

In particular, when the driving range of the vehicle is the main driving range, the controller 40 may be configured to select a current command configured with the d-axis current and the q-axis current from the current map, in which combination of the d-axis current and the q-axis current minimizes current consumed in the motor 20 based on the required torque and the motor speed. Then the controller 40 may be configured to output the current command to operate the motor 20.

The minimum current control may be performed using a maximum torque per ampere (MTPA) scheme. An intersection point at which the equal torque curve and the constant current circle meet may be an operation point, and a trajectory of the MTPA scheme may be configured by connecting the intersection point shortest from the origin (referring to FIG. 2). The supplementary driving range may be a driving range that excludes the main driving range. The supplementary driving range may be used substantially less often compared to the main driving range. For example, the supplementary driving range may be used when the vehicle starts rapidly, rapidly accelerates, or rapidly decelerates.

However, the noise vibration and harshness (NVH) performance of the vehicle may be deteriorated by vibration and noise generated from the motor when the vehicle starts rapidly, rapidly accelerates, or rapidly decelerates. Since generation degree of the supplementary driving range may be significantly lower compared to the main driving range, a control strategy may be performed to minimize noise and vibration generated from the motor 20.

Therefore, when the driving range of the vehicle is the supplementary driving range, the controller 40 may be configured to select a current command configured with the d-axis current and the q-axis current from the current map, in which combination of the d-axis current and the q-axis current minimizes vibration and noise of the motor (e.g., minimizes the torque ripple of the motor) based on the required torque and the motor speed, and output the current command.

Hereinafter, a method for controlling an electric vehicle according to an exemplary embodiment of the present invention will be described in detail with reference to accompanying drawings.

Figure 3:
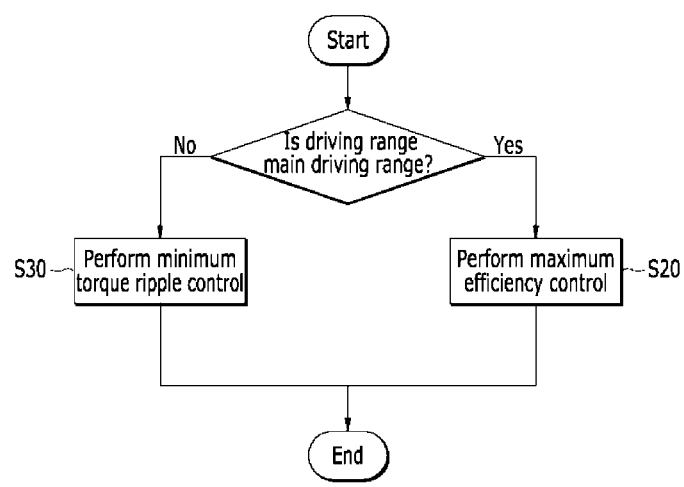
FIG. 3 is an exemplary flowchart illustrating a method for controlling an electric vehicle according to an exemplary embodiment of the present invention.

FIG. 3 is an exemplar flowchart illustrating a method for controlling an electric vehicle according to an exemplary embodiment of the present invention. As shown in FIG. 3, the controller 40 may be configured to detect the driving range of the vehicle at step S10. The driving range of the vehicle may be divided into the main driving range and the supplementary driving range from the motor speed and the required torque of the driver. The driving range of the vehicle may be determined from a test result of a UDDS mode and an HWY mode.

The controller 40 may be configured to perform the maximum efficiency control in which the efficiency of the motor may be maximized (e.g., the minimum current control in which current consumed in the motor is minimized) when the driving range of the vehicle is the main driving range at step S20. In other words, the controller 40 may be configured to select a current command configured with the d-axis current and the q-axis current from the current map, wherein combination of the d-axis current and the q-axis based on the required torque and the motor speed may minimize current consumed in the motor 20. Additionally, the controller 40 may be configured to output the current command to operate the motor 20.

When the driving range of the vehicle is the supplementary driving range, the controller 40 may be configured to perform the minimum torque ripple control in which the torque ripple of the motor 20 may be minimized at step S30. In other words, the controller 40 may be configured to select a current command configured with the d-axis current and the q-axis current from the current map, in which combination of the d-axis current and the q-axis current based on the required torque and the motor speed may minimize vibration and noise of the motor (e.g., the torque ripple of the motor may be minimized), and the controller 40 may be configured to output the current command.

As described above, the technical feature of the apparatus and the method for controlling the electric vehicle according to an exemplary embodiment of the present invention is that the minimum current control or the minimum torque ripple control may be selectively performed according to the driving range of the vehicle. Since the minimum current control or the minimum torque ripple control may be selectively performed based on the driving range of the vehicle, it may be possible to minimize fuel consumption of the vehicle and reduce vibration and noise generated by the torque ripple of the motor.

DESCRIPTION OF SYMBOLS

10: battery
20: motor
30: inverter
40: controller

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An apparatus for controlling an electric vehicle, comprising:
   a battery configured to charge electrical energy;
   a motor configured to generate a driving torque from electrical energy charged in the battery; and
   a controller configured to determine a driving range of the vehicle, perform maximum efficiency control in which efficiency of the motor is maximized when the driving range of the vehicle is a main driving range, and perform minimum torque ripple control in which torque ripple of the motor is minimized when the driving range of the vehicle is a supplementary driving range,
   wherein the controller is configured to divide the driving range of the vehicle into a main driving range and a supplementary driving range from a motor speed and a required torque of a driver.

2. The apparatus of claim 1, wherein the maximum efficiency control is a minimum current control in which current consumed in the motor is minimized.

3. The apparatus of claim 2, wherein in the minimum current control, the controller is configured to select a current command configured with the d-axis current and the q-axis current from a predetermined current map, in which combination of the d-axis current and the q-axis current minimizes current consumed in the motor based on the required torque and the motor speed, and the controller is configured to output the current command.

4. The apparatus of claim 1, wherein in the minimum torque ripple control, the controller is configured to select a current command configured with the d-axis current and the q-axis current from a predetermined current map, in which combination of the d-axis current and the q-axis current minimizes vibration and noise of the motor based on the required torque and the motor speed, and the controller is configured to output the current command.

5. A method for controlling an electric vehicle comprising:
   determining, by a controller, a driving range of the vehicle; and
   selectively performing, by the controller, maximum efficiency control that maximizes efficiency of a motor or minimum torque ripple control that minimizes a torque ripple of the motor based on the driving range of the vehicle,
   wherein the driving range of the vehicle is divided into a main driving range and a supplementary driving range from a motor speed and a required driver torque.

6. The method of claim 5, wherein the maximum efficiency control is a minimum current control in which current consumed in the motor is minimized.

7. The method of claim 6, further comprising:
   selecting, by the controller, a current command configured with a d-axis current and a q-axis current from a predetermined current map, in which combination of the axis current and the q-axis according to the required torque and the motor speed minimizes current consumed in the motor; and
   outputting, by the controller, the current command when the driving range of the vehicle is the main driving range.

8. The method of claim further comprising:
   selecting, by the controller, a current command configured with a d-axis current and a q-axis current from a predetermined current map, in which combination of the d-axis current and the q-axis current according to the required torque and the motor speed minimizes torque ripple of the motor; and
   outputting, by the controller, the current command when the driving range of the vehicle is the supplementary driving range.

9. A non-transitory computer readable medium containing program instructions executed by a controller, the computer readable medium comprising:
   program instructions that determine a driving range of the vehicle; and
   program instructions that selectively perform maximum efficiency control that maximizes efficiency of a motor or minimum torque ripple control that minimizes a torque ripple of the motor based on the driving range of the vehicle,
   wherein the driving range of the vehicle is divided into a main driving range and a supplementary driving range from a motor speed and a required driver torque.

10. The non-transitory computer readable medium of claim 9, wherein the maximum efficiency control is a minimum current control in which current consumed in the motor is minimized.

11. The non-transitory computer readable medium of claim 10, further comprising:
- program instructions that select a current command configured with a d-axis current and a q-axis current from a predetermined current map, in which combination of the axis current and the q-axis according to the required torque and the motor speed minimizes current consumed in the motor; and
- program instructions that output the current command when the driving range of the vehicle is the main driving range.

12. The non-transitory computer readable medium of claim 9, further comprising:
- program instructions that select a current command configured with a d-axis current and a q-axis current from a predetermined current map, in which combination of the d-axis current and the q-axis current according to the required torque and the motor speed minimizes torque ripple of the motor; and
- program instructions that output the current command when the driving range of the vehicle is the supplementary driving range.

* * * * *